United States Patent
Ayukawa et al.

(10) Patent No.: US 8,130,520 B2
(45) Date of Patent: Mar. 6, 2012

(54) POWER SUPPLY APPARATUS AND SEMICONDUCTOR INTEGRATED CIRCUIT DEVICE

(75) Inventors: Kazuhito Ayukawa, Tokyo (JP); Nobutoshi Kasai, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 437 days.

(21) Appl. No.: 12/400,126

(22) Filed: Mar. 9, 2009

(65) Prior Publication Data

US 2009/0257258 A1   Oct. 15, 2009

(30) Foreign Application Priority Data

Apr. 11, 2008 (JP) ................................. 2008-103758

(51) Int. Cl.
*H02M 5/458* (2006.01)

(52) U.S. Cl. .............................. 363/79; 323/207; 363/84

(58) Field of Classification Search ............... 363/78–79, 363/81, 84, 89; 323/207, 222
See application file for complete search history.

(56) References Cited

U.S. PATENT DOCUMENTS 5,909,361 A * 6/1999 Kim ........................... 363/21.16
6,091,233 A * 7/2000 Hwang et al. ................. 323/222

FOREIGN PATENT DOCUMENTS

JP   2007-195282 A   8/2007

* cited by examiner

*Primary Examiner* — Harry Behm
(74) *Attorney, Agent, or Firm* — Mattingly & Malur, PC

(57) ABSTRACT

The present invention is directed to largely improve the efficiency at the time of light load of a power supply apparatus using a power factor correction (PFC) controller. A PFC controller is provided with a voltage-current converter. The voltage-current converter converts voltage of a signal output from an error amplifier for detecting voltage level of output voltage to an arbitrary current value and outputs the current value as a correction current. The voltage-current converter outputs a correction current of a large current value when the error amplifier detects that the load is light, and the PFC controller performs control to decrease the output voltage.

6 Claims, 12 Drawing Sheets

POWER SUPPLY APPARATUS AND SEMICONDUCTOR INTEGRATED CIRCUIT DEVICE

CROSS-REFERENCE TO RELATED APPLICATIONS

The disclosure of Japanese Patent Application No. 2008-103758 filed on Apr. 11, 2008 including the specification, drawings and abstract is incorporated herein by reference in its entirety.

BACKGROUND OF THE INVENTION

The present invention relates to a power generating technique by an AC/DC converter and, more particularly, to a technique effective to control an output voltage by using a PFC (Power Factor Correction) controller.

For a power supply in an electronic device such as a computer and a server, in recent years, energy saving is an important challenge. For example, to achieve the efficiency specified, particularly, as light load (for example, 20% of the maximum load) in a power saving standard such as Energy Star 4.0 or 80plus, power supply manufacturers make various efforts and spend money.

As a power supply apparatus of this kind, a PFC power supply apparatus is widely known, to satisfy the above-described power saving standard. The PFC power supply apparatus takes a power factor correction (PFC) measure of making current flowing in a commercial power supply close to a sine wave in order to suppress higher harmonic current at the first stage of the power supply apparatus.

Two types of PFC power supply apparatus are known; a PFC power supply apparatus of a passive filter type including an inductance in an input line of the device and smoothing current, and a PFC power supply apparatus of an active filter type of controlling current by using a dedicated PFC controller and a discrete element. Recently, a PFC power supply apparatus of the active filter type which is small and light has become mainstream.

A PFC power supply apparatus of the active filter type includes, for example, a booster converter and a PFC controller. By comparing a feedback voltage amount divided by a voltage feedback resistor that divides output voltage, a current amount detected by a current detecting resistor, and a triangular wave, the on duty of a switching transistor in the converter is controlled to maintain the output voltage constant. The apparatus also performs control of making current flowing in the current detecting resistor, that is, current flowing in so-called AC (alternating current) input close to a sine wave.

The PFC power supply apparatus of the active filter type is classified into: a critical mode PFC power supply apparatus having a mode of detecting that boosted coil current is zero and, after that, switching a switching transistor; and a continuous current mode PFC power supply apparatus for maintaining average current equal to an AC reference signal.

SUMMARY OF THE INVENTION

However, the inventors of the present invention have found that the power factor correction technique using the PFC controller has the following problems.

The output voltage of the PFC power supply apparatus is always controlled to be almost constant, and the voltage is about 400V so that, in the case of considering a worldwide commercial AC voltage, the boosting operation can be performed normally to about 240V.

Now, efficiency is considered. In a current continuous mode, when the switching transistor is off, voltage of about 400V is applied from output voltage to the drain. When the switching transistor is turned on from the off state, charges accumulated in parasitic capacitance of the drain are discharged via the drain and source.

The higher the drain voltage is, or the higher the set output voltage is, the larger a loss which occurs at this time is. For example, a problem occurs such that the voltage conversion efficiency largely deteriorates in the case that a high voltage level is not necessary for output voltage at the time of light load or the like.

In a critical mode, when the output power is small, the switching frequency of a PFC power supply increases. The number of switching times per unit time increases, and a switching loss increases. As a result, a problem such that the voltage conversion efficiency deteriorates occurs.

An object of the present invention is to provide a technique of largely improving the efficiency when the load on the power supply apparatus using the PFC controller is light.

The above and other objects of the present invention and novel features will become apparent from the description of the specification and the appended drawings.

An outline of representative inventions out of the inventions disclosed in the application will be briefly described as follows.

The present invention provides a power supply apparatus including: a power supply unit for boosting an AC input power source and outputting the boosted power source as a DC output voltage; and a PFC controller for controlling a switching transistor provided for the power supply unit to suppress harmonic current. The power supply unit has a feedback resistor for detecting feedback voltage of output voltage used when the PFC controller controls the switching transistor so that the output voltage becomes constant. The PFC controller has: a drive controller for controlling the switching transistor in accordance with the feedback voltage detected by the feedback resistor; and a current correction controller for detecting load level from the output voltage generated by the power supply unit, generating arbitrary correction current in accordance with the load level, and supplying the correction current to the feedback resistor. The lighter the detected load level is, the more the current correction controller increases a current value of the correction current and supplies the current value to the feedback resistor to decrease the output voltage generated by the power supply unit.

In the present invention, preferably, the current correction controller includes: a load detector for detecting load level from the output voltage generated by the power supply unit; and a current corrector for generating arbitrary correction current in accordance with the load level detected by the load detector and supplying the correction current to the feedback resistor.

Further, in the present invention, preferably, the load detector is an error amplifier for comparing the feedback voltage detected by the feedback resistor with a reference voltage and outputting an error signal.

In the present invention, preferably, the power supply unit has a current detector for detecting current flowing to the output voltage of the power supply unit, and the load detector detects load level on the basis of the current value detected by the current detector.

Further, in the present invention, preferably, the PFC controller performs control in an interleave critical mode.

An outline of another invention of the application will be briefly described.

The present invention provides a semiconductor integrated circuit device having a PFC controller for suppressing harmonic current by controlling a switching transistor provided for a power supply unit for boosting an AC input power source and outputting the boosted power source as DC output voltage. The PFC controller includes: a drive controller for controlling the switching transistor in accordance with feedback voltage supplied from the outside; and a current correction controller for detecting a load level from the output voltage generated by the power supply unit, generating arbitrary correction current in accordance with the load level, and supplying the correction current to the drive controller. The lighter the detected load level is, the more the current correction controller increases a current value of the correction current and supplies the current value to the drive controller to decrease the output voltage generated by the power supply unit.

In the present invention, preferably, the current correction controller includes: a load detector for detecting load level from output voltage generated by the power supply unit; and a current corrector for generating arbitrary correction current in accordance with the load level detected by the load detector.

Further, in the present invention, preferably, the load detector is an error amplifier for comparing the feedback voltage with a reference voltage and outputting an error signal.

In the invention, preferably, the PFC controller performs control in an interleave critical mode.

Effects obtained by the representative ones of the inventions disclosed in the application will be briefly described as follows.

The power conversion efficiency at the time of light load can be improved.

DETAILED DESCRIPTION OF PREFERRED EMBODIMENTS OF THE INVENTION

Figure 1:
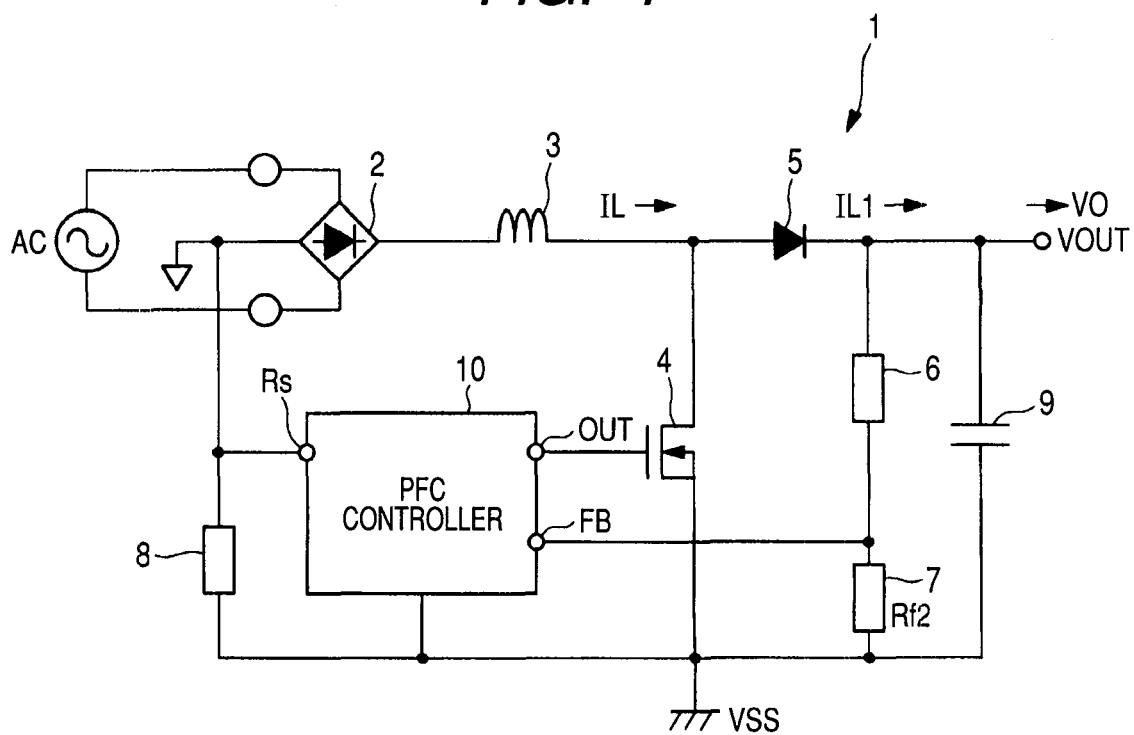
FIG. 1 is a circuit diagram showing a configuration example of a power supply apparatus as a first embodiment of the present invention.

Embodiments of the present invention will be described in detail hereinbelow with reference to the drawings. In all of the drawings for explaining the embodiments, the same reference numerals are designated to the same member as a rule and repetitive description will not be given.

First Embodiment

Figure 2:
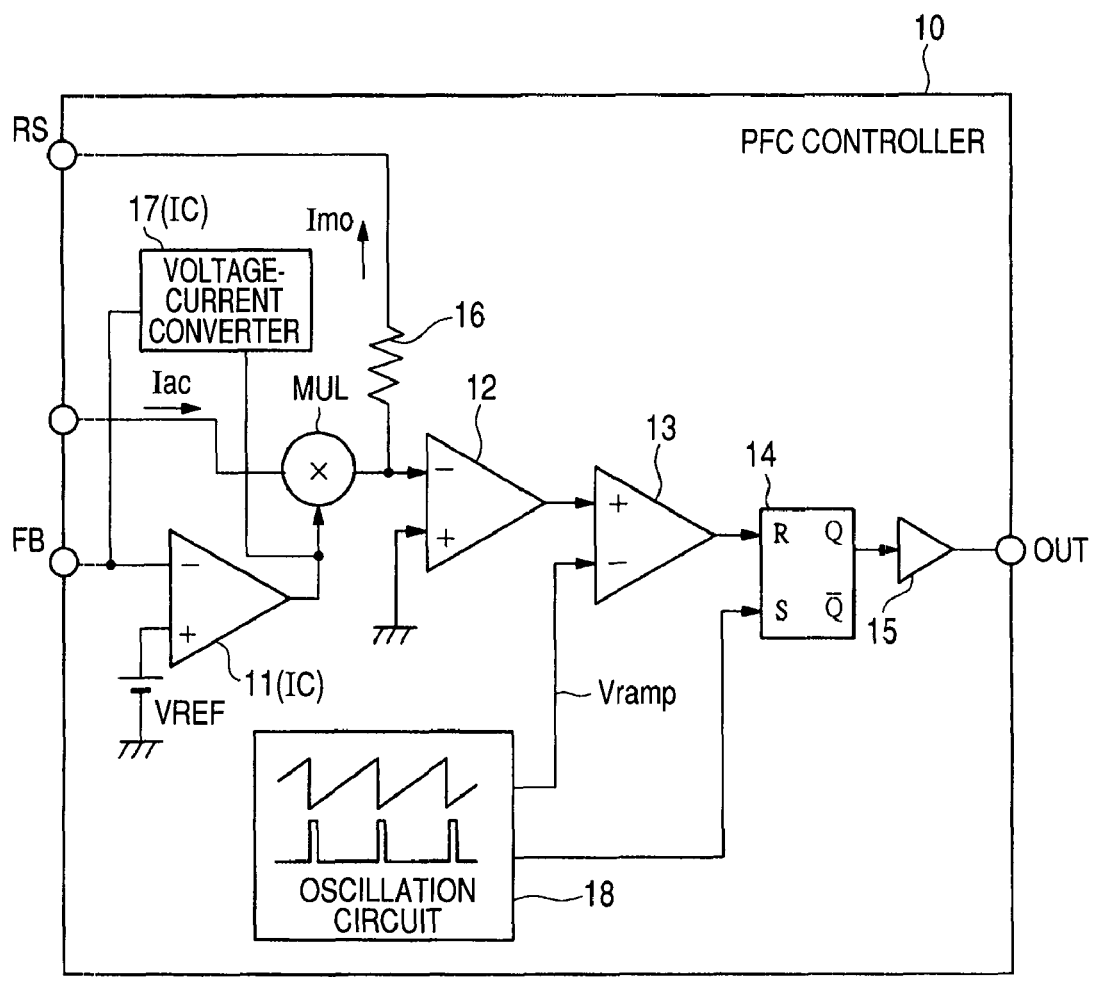
FIG. 2 is a circuit diagram showing a configuration example of a PFC controller provided for the power supply apparatus in FIG. 1.
Figure 3:
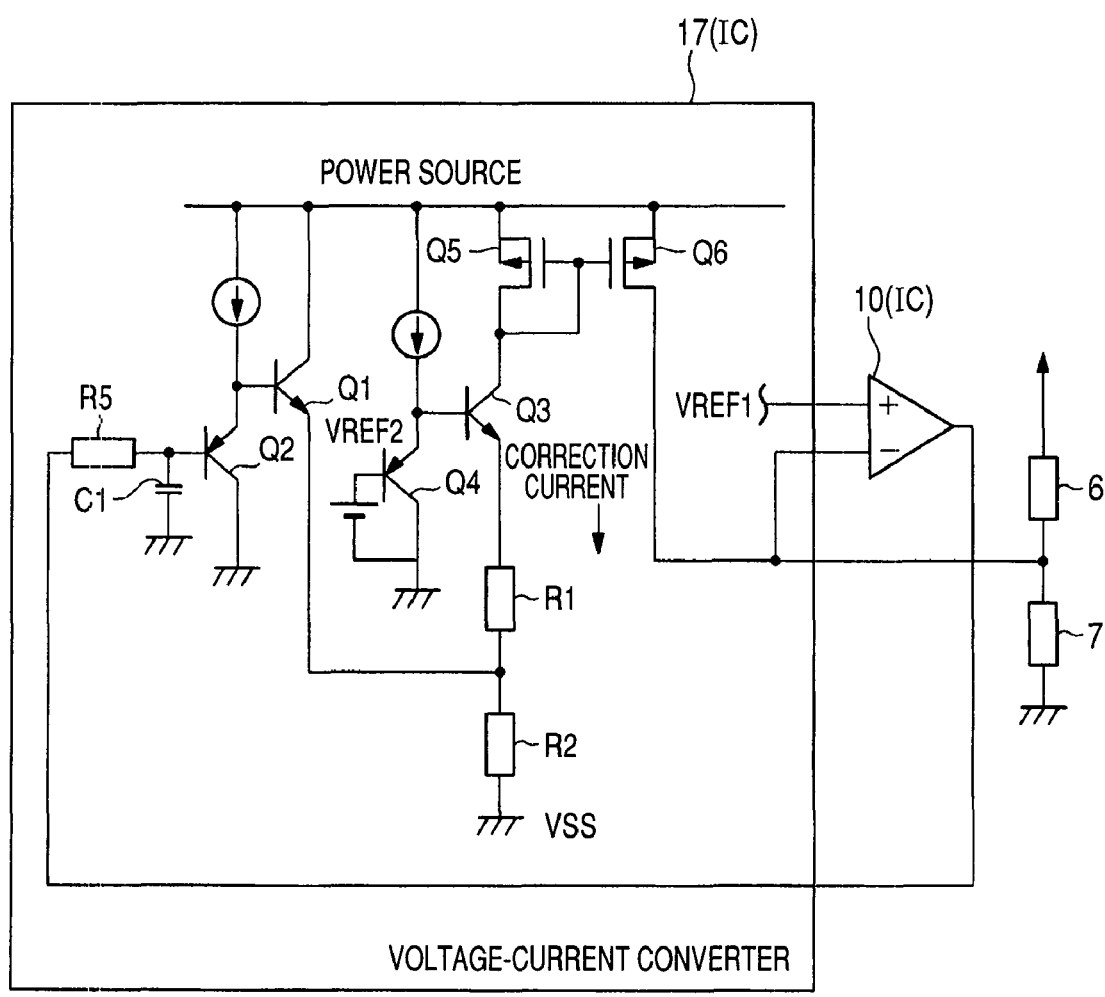
FIG. 3 is a circuit diagram showing the configuration of a voltage-current converter provided for the PFC controller in FIG. 2.

FIG. 1 is a circuit diagram showing a configuration example of a power supply apparatus as a first embodiment of the present invention. FIG. 2 is a circuit diagram showing a configuration example of a PFC controller provided for the power supply apparatus in FIG. 1. FIG. 3 is a circuit diagram showing the configuration of a voltage-current converter provided for the PFC controller in FIG. 2.

In the first embodiment, the power supply apparatus 1 is an AC-DC booster converter under PFC control in a continuous current mode for maintaining average current almost equal to a reference signal of alternating current.

The power supply apparatus 1 has, as shown in FIG. 1, a full-wave rectification circuit 2, a coil 3, a transistor 4, a diode 5, resistors 6 to 8, a capacitance element 9, and a PFC controller 10. A power supply unit is comprised of the full-wave rectification circuit 2, coil 3, transistor 4, diode 5, resistors 6 to 8, and capacitance element 9.

The full-wave rectification circuit 2 is comprised of, for example, a bridge circuit using four diodes. An alternating current power supply AC such as a commercial power supply is coupled to an input unit of the circuit 2. One of the coupling parts of the coil 3 is coupled to one of terminals on the output side of the full-wave rectification circuit 2. The anode of the diode 5 and one of the coupling parts of the transistor 4 are coupled to the other coupling part of the coil 3.

A reference potential VSS is coupled to the other coupling part of the transistor 4 as a transistor for switching. To the gate of the transistor 4, an output terminal OUT of the PFC controller 10 is coupled. The transistor 4 is, for example, an N-channel MOS (Metal Oxide Semiconductor).

To the other terminal on the output side of the full-wave rectification circuit 2, one of the coupling parts of the resistor 8 and a current detection terminal RS provided for the PFC controller 10 are coupled. A reference potential VSS is coupled to the other coupling part of the resistor 8.

To the cathode of the diode 5, one of the coupling parts of the resistor 6 as a part of a feedback resistor and one of the coupling parts of the capacitance element 9 are coupled. A DC power is output from the node. To the other coupling part of the resistor 6, one of the coupling parts of the resistor 7 as a part of the feedback resistor is coupled. To the coupling part, a feedback voltage input terminal FB of the PFC controller 10 is coupled. To the other coupling part of the resistor 7 and the other coupling part of the capacitance element 9, the reference potential VSS is coupled.

The on/off state of the transistor 4 is controlled by a switch control signal output from the PFC controller 10. In the on state of the transistor 4, the coil 3 as an inductor accumulates energy by current supplied from the full-wave rectification circuit 2. In the off state of the transistor 4, the capacitance element 9 as a smoothing capacitor is charged with a current IL1 that flows via the diode 5 by the energy accumulated in the coil 3.

By repeating the operation cycle, boosting operation is performed and a smoothed output voltage VO is obtained at an output terminal VOUT of the power supply apparatus 1. The PFC controller 10 monitors the voltage of the output terminal VOUT by a divided voltage (feedback voltage) by the resistors 6 and 7 as feedback resistors and generates a switch control signal for turning on/off the transistor 4 in a continuous mode, thereby performing control of maintaining the boosted voltage constant and making AC input current close to sine wave.

FIG. 2 is a circuit diagram showing a configuration example of the PFC controller 10.

The PFC controller 10 includes an error amplifier 11, a current amplifier 12, a comparator 13, a flip flop 14, a buffer 15, a resistor 16, a voltage-current converter 17, an oscillation circuit 18, and a multiplier MUL and is configured as a semiconductor integrated circuit device.

A feedback voltage input terminal FB is coupled to the negative (−) side input terminal of the error amplifier 11 as a load detector, and a reference voltage VREF is input to the positive (+) side input terminal of the error amplifier 11.

To the output part of the error amplifier 11, one of the input parts of the multiplier MUL and the input part of the voltage-current converter 17 as a current correcting unit are coupled. To the output part of the multiplier MUL, the negative (−) side input terminal of the current amplifier 12 and the other coupling part of the resistor 16 are coupled. To the output part of the voltage-current converter 17, the negative (−) side input terminal of the error amplifier 11 is coupled.

The voltage-current converter 17 converts the voltage of the signal output from the error amplifier 11 to an arbitrary current value and outputs it as correction current. A current correction controller IC is comprised of the error amplifier 11 and the voltage-current converter 17. The current correction controller IC performs control of decreasing the output voltage VO of the power supply apparatus 1 by injecting the correction current to the resistor 7 when the load on the power supply apparatus 1 is light.

To the other input part of the multiplier MUL, current information Iac is input. For example, anodes of two diodes are coupled to both ends of the alternating current power supply AC, cathodes of the two diodes are coupled to one of coupling parts of a resistor, and a signal output from the other coupling of the resistor is the current information Iac.

To the positive (+) side input terminal of the current amplifier 12, the reference potential VSS is coupled. To the output part of the current amplifier 12, the positive (+) side input terminal of the comparator 13 is coupled.

Further, to the negative (−) side input terminal of the comparator 13, ramp waveform output from the oscillation circuit 18 is input. To the output part of the comparator 13, a reset terminal R of the flip flop 14 is coupled. To a set terminal S of the flip flop 14, pulse waveform output from the oscillation circuit 18 is input.

To an output terminal Q of the flip flop 14, the input part of the buffer 15 is coupled. To the output part of the buffer 15, the output terminal OUT is coupled.

The multiplier MUL multiplies the current information Iac obtained by converting the input voltage information of the alternating current power supply AC by the above-described two diodes and one resistor externally provided and an output of the error amplifier 11 according to the feedback voltage by the resistors 6 and 7.

An output of the multiplier MUL is input to the negative (−) side imputer terminal of the current amplifier 12, and coupled to the resistor 8 as a current detection resistor via the resistor 16. The signal is fed back to the current amplifier 12 via the resistor 8 by the current Imo flowing in the resistor 16.

That is, the current of the inverting input terminal of the current amplifier 12 is controlled so that the voltage waveform of the resistor 8 becomes similar to the voltage of the alternating current power supply AC. The output voltage of the current amplifier 12 is compared with a ramp voltage Vramp having the ramp waveform output from the oscillation circuit 18 by the comparator 13, and the on duty of a switch control signal is determined.

The flip flop 14 is set by a signal having a pulse waveform generated according to the trailing edge of the ramp waveform, and the switch control signal is turned on. In the continuous mode, the frequency of the switch control signal is fixed.

Next, the operation of the current correction controller IC in the embodiment will be described.

FIG. 3 is a circuit diagram showing the configuration of the voltage-current converter 17.

The voltage-current converter 17 is comprised of, as shown in the diagram, transistors Q1 to Q6, resistors R1, R2, and R5, and a capacitance element C1. The transistors Q1 and Q3 are of the NPN type, and the transistors Q2 and Q4 are of the PNP type. The transistors Q5 and Q6 are N-channel MOS.

A source voltage is coupled to one of the coupling parts (collector) of each of the transistors Q1, Q5, and Q6. To one of the coupling parts (emitter) of each of the transistors Q2 and Q4 and to the base of each of the transistors Q1 and Q3, source voltage is coupled via a constant current source.

To the gate of the transistor Q5, the other coupling part of the transistor Q5, the gate of the transistor Q6, and one of the coupling parts of the transistor Q3 are coupled.

The resistors R1 and R2 are coupled in series between the other coupling part of the transistor Q3 and the reference potential VSS. The coupling part between the resistors R1 and R2 is coupled to the other coupling part of the transistor Q1.

To the base of the transistor Q4, a reference voltage VREF2 is supplied. To the base of the transistor Q2, one of the coupling parts of the capacitance element C1 and one of the coupling parts of the resistor R5 are coupled. To the other coupling part of the resistor R5, an output part of the error amplifier 11 is coupled.

To the other coupling part of the transistor Q6, the negative (−) side input terminal of the error amplifier 11 is coupled. To the other coupling part of the capacitance element C1 and the other coupling part of each of the transistors Q2 and Q4, the reference potential VSS is coupled.

In the voltage-current converter 17, the output voltage output from the error amplifier 11 and the reference voltage VREF2 are compared with each other. In a state where the output voltage of the error amplifier 11 is low, a current obtained by dividing the difference voltage by the resistor R1 flows in the transistor Q3. Further, the current is sent back by a current mirror configured by the transistors Q5 and Q6 and is passed as a correction current to the negative (−) side input terminal of the error amplifier 11, that is, to the resistor 7 as a feedback resistor.

The current flowing in the transistor Q3 increases until the output voltage of the error amplifier 11 becomes the voltage obtained by dividing the reference voltage VREF2 by the resistors R1 and R2. Below the voltage, the current becomes constant at VREF2/(R1+R2).

As described above, by adjusting the resistance values of the resistors R1, R2, and R5, the output voltage VO and a change amount of the output voltage VO can be arbitrarily set. For example, by making settings so that the voltage becomes 400V at the time of rated load and becomes 320V at the time of light load, a switching loss can be reduced and the standard such as Energy Star or 80Plus can be satisfied at low cost.

In the first embodiment, by the current correction controller IC, the voltage level of the output voltage VO can be decreased at the time of low load of the power supply apparatus 1 at low cost. A loss occurring at the time of discharging parasitic capacitance of the drain when the transistor 4 is on can be reduced.

Second Embodiment

Figure 4:
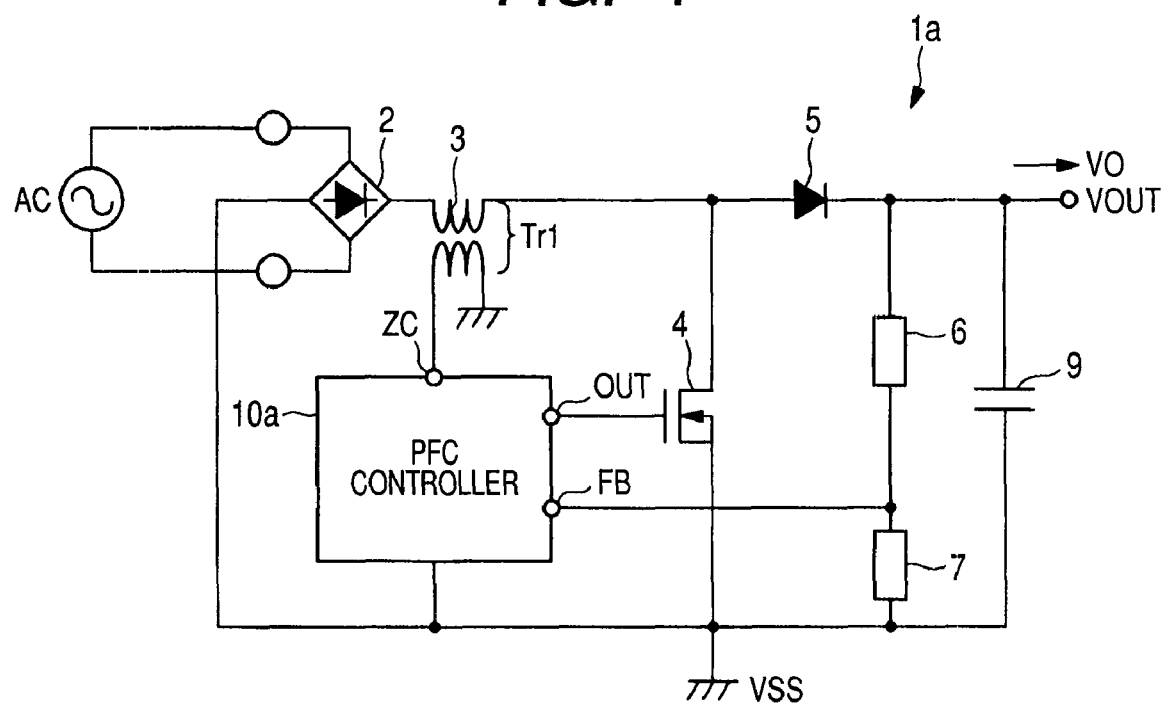
FIG. 4 is a circuit diagram showing a configuration example of a power supply apparatus as a second embodiment of the present invention.
Figure 5:
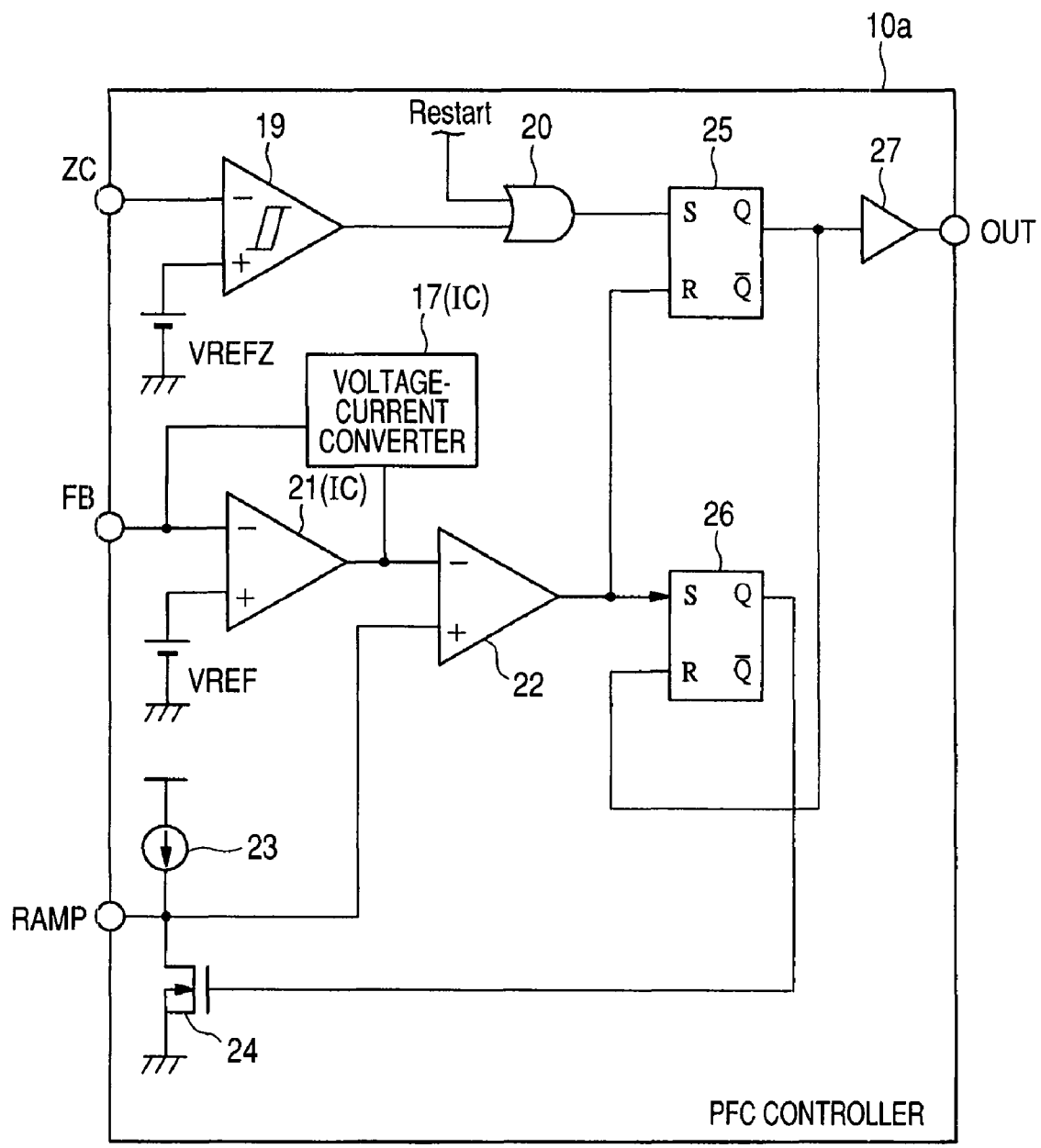
FIG. 5 is a circuit diagram showing a configuration example of a PFC controller provided for the power supply apparatus in FIG. 4.

FIG. 4 is a circuit diagram showing a configuration example of a power supply apparatus as a second embodiment of the present invention. FIG. 5 is a circuit diagram showing a configuration example of a PFC controller provided for the power supply apparatus in FIG. 4.

In the second embodiment, a power supply apparatus 1a is an AC-DC booster converter under PFC control in a critical mode. The power supply apparatus 1a has, as shown in FIG. 4, a configuration obtained by newly adding a transformer Tr1 using the coil 3 as a primary coil to a configuration similar to that of the first embodiment including the full-wave rectification circuit 2, the coil 3, the transistor 4, the diode 5, the resistors 6 and 7, the capacitance element 9, and a PFC controller 10a.

In the critical mode, it is detected that the current of the coil 3 is zero and, after that, the transistor 4 is switched.

To one of the ends on the secondary side of the transformer Tr1, a current detection terminal ZC of the PFC controller 10a is coupled. To the other end on the secondary side of the transformer Tr1, the reference potential VSS is coupled.

The other coupling configuration is similar to that of the first embodiment. The PFC controller 10a monitors the voltage of the output terminal VOUT by voltage (feedback voltage) divided by the resistors 6 and 7, and detects the presence or absence of current flowing in the coil 3 via a secondary coil of the transformer Tr1.

On the basis of the input and the like, the PFC controller 10a generates a switch control signal for controlling the on duty of the transistor 4 to maintain boosted voltage constant in the critical mode, and performs a control of making AC input current close to a sine wave.

FIG. 5 is a circuit diagram showing a configuration example of the PFC controller 10a.

The PFC controller 10a includes, as shown in the diagram, the voltage-current converter 17, a comparator 19, an OR circuit 20, an error amplifier 21, a comparator 22, a constant current source 23, a transistor 24, flip flops 25 and 26, and a buffer 27.

The current detection terminal ZC is coupled to the negative (−) side input terminal of the comparator 19, and a reference voltage VREFZ is input to the positive (+) side input terminal of the comparator 19.

To the output part of the comparator 19, the input part of the OR circuit 20 is coupled. To one of input parts of the OR circuit 20, a restart signal Restart is input.

To the output part of the OR circuit 20, a set terminal S of the flip flop 25 is coupled. To the negative (−) side input terminal of the error amplifier 21 as a load detector, the feedback voltage input terminal FB is coupled. To the positive (+) side input terminal of the error amplifier 21, the reference voltage VREF is input.

To the output part of the error amplifier 21, the input part of the voltage-current converter 17 and the negative (−) side input terminal of the comparator 22 are coupled. To the output part of the voltage-current converter 17, the negative (−) side input terminal of the error amplifier 21 is coupled.

The voltage-current converter 17 converts the voltage of the signal output from the error amplifier 21 to an arbitrary current value and outputs it as correction current. A current correction controller IC is comprised of the error amplifier 21 and the voltage-current converter 17. The current correction controller IC performs control of decreasing the output voltage VO of the power supply apparatus 1a by injecting the correction current to the resistor 7 when the load on the power supply apparatus 1a is light.

To the output part of the comparator 22, a reset terminal R of the flip flop 25 and a set terminal S of the flip flop 26 are coupled. To the reset terminal R of the flip flop 26, an output terminal Q of the flip flop 25 and the input part of the buffer 27 are coupled.

To the output part of the buffer 27, an output terminal OUT is coupled, and a switch control signal is output from the buffer 27. To an output terminal Q of the flip flop 26, the gate of the transistor 24 is coupled.

To one of coupling parts of the transistor 24, a source voltage is coupled via the constant current source 23. To the other coupling part of the transistor 24, the reference potential VSS is coupled. A ramp voltage terminal RAMP coupled to the PFC controller 10a is provided. A capacitance element Cramp coupled externally is coupled between the ramp voltage terminal RAMP and the reference potential VSS.

The comparator 19 detects the presence or absence of current flowing in the coil 3 via the secondary coil of the transformer Tr1. The comparator 19 receives induction voltage generated by the secondary coil of the transformer Tr1 and, when the induction voltage becomes lower than the reference voltage VREFZ, outputs a high-level detection signal.

The reference voltage VREFZ is a threshold value for detecting that current flowing in the coil 3 becomes zero. By the high-level output of the comparator 19, the flip flop 25 is set via the OR circuit 20.

A signal Q output from the output terminal Q of the flip flop 25 is output as a switch control signal from the output terminal OUT via the buffer 27. By setting the flip flop 25, the transistor 4 is turned on by the high-level switch control signal. During the on state, current flows in the coil 3 via the transistor 4, and energy is accumulated in the coil 3.

At this time, by the high-level output of the flip flop 25 which is set, the flip flop 26 is reset. The flip flop 26 in the reset state cuts off the transistor 24 made of an N-channel MOS.

As described above, the constant current source 23 is coupled in series to the transistor 24. By the capacitance element Cramp coupled to the ramp voltage terminal RAMP, ramp voltage which linearly increases is generated.

The ramp voltage is compared with an output of the error amplifier 21 that amplifies feedback voltage input from the feedback voltage input terminal FB in the comparator 22. An output of the error amplifier 21 is decreased as the feedback voltage becomes larger with respect to the reference voltage VREF.

When the ramp voltage which increases gradually exceeds the output voltage of the error amplifier 21, the flip flop 26 is set, and the flip flop 25 is reset. When the flip flop 26 is set, the transistor 24 is turned on, and the ramp voltage is discharged to the reference potential VSS.

When the flip flop 25 is reset, the switch control signal is inverted to the low level, and the transistor 4 is cut off. When the transistor 4 is cut off, current according to the energy accumulated in the coil 3 in the on period of the transistor 4 flows to the diode 5 to charge the capacitance element 9.

When current becomes zero, an output of the comparator 19 becomes high. The transistor 4 is turned on again by the switch control signal, and the cycle is repeated. As the boosted voltage of the output terminal VOUT becomes closer to a target level, the on period of the transistor 4 is shortened. In response to detection of zero current in the coil 3, the timing to turn on the transistor 4 is determined. In such a manner, the on duty and frequency of the switch control signal are controlled.

Since the configuration and operation of the voltage-current converter 17 are similar to those of FIG. 3 of the first embodiment, the description will not be repeated.

In this case as well, by adjusting the resistance values of the resistors R1, R2, and R5 in the voltage-current converter 17, the output voltage VO and a change amount of the output voltage VO can be arbitrarily set. Therefore, the low-loss power supply apparatus 1a can be realized at low cost.

Consequently, in the second embodiment, since the control is performed so that the output voltage VO decreases at the time of low load, the number of switching times of the transistor 4 can be largely reduced, and a switching loss can be decreased.

Third Embodiment

Figure 6:
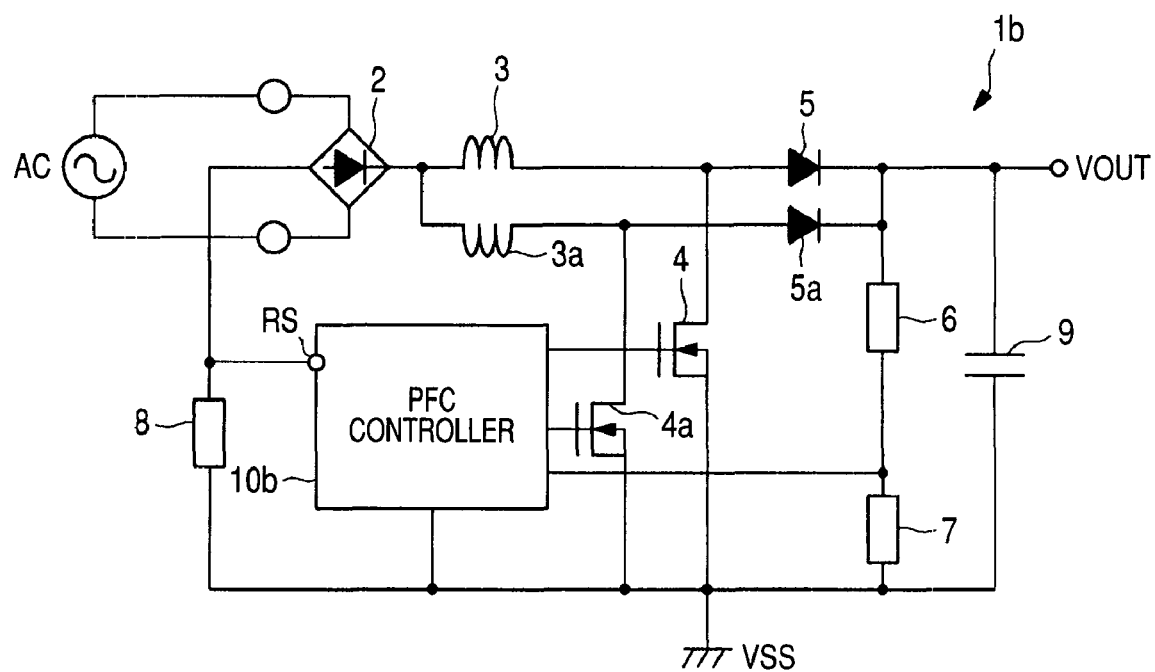
FIG. 6 is a circuit diagram showing a configuration example of a power supply apparatus as a third embodiment of the present invention.
Figure 7:
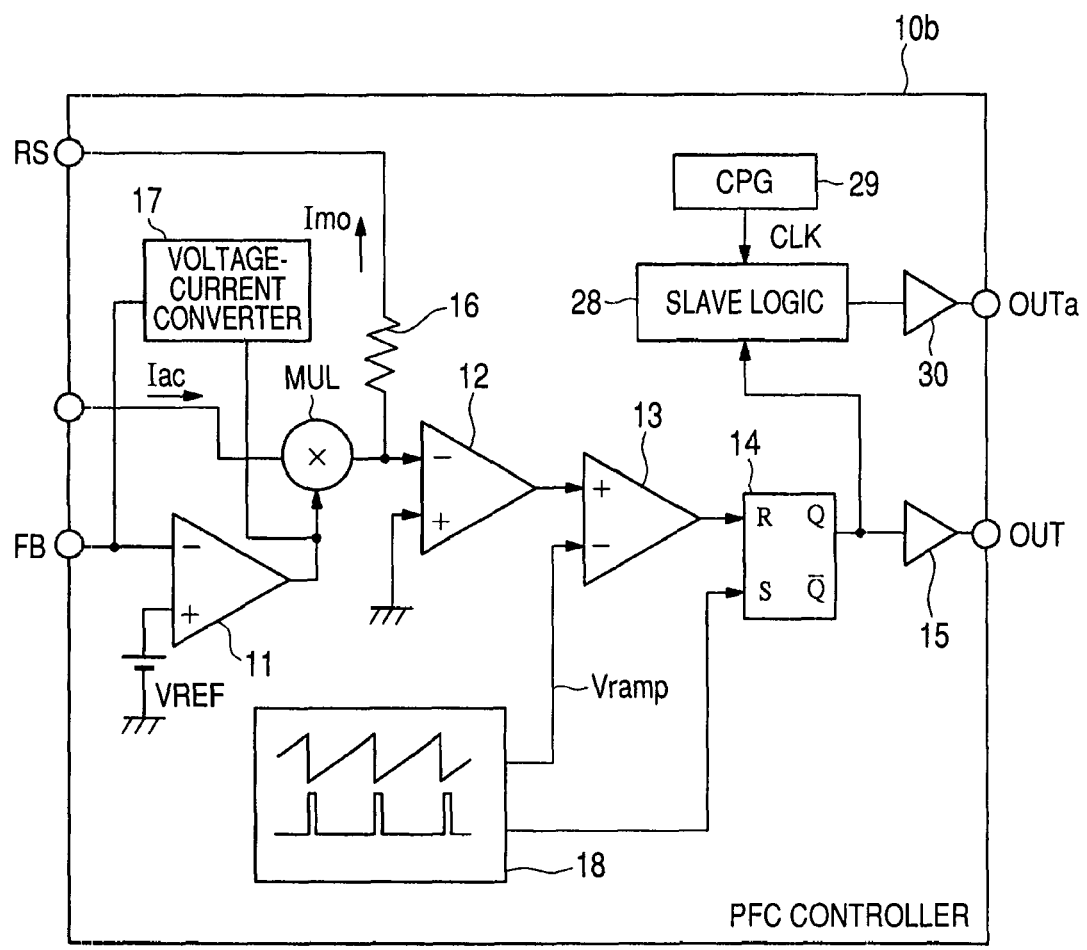
FIG. 7 is a circuit diagram showing a configuration example of a PFC controller provided for the power supply apparatus in FIG. 6.

FIG. 6 is a circuit diagram showing a configuration example of a power supply apparatus as a third embodiment of the present invention. FIG. 7 is a circuit diagram showing a configuration example of a PFC controller provided for the power supply apparatus in FIG. 6.

In the third embodiment, a power supply apparatus 1b is an AC-DC booster converter under PFC control in an interleave continuous mode of making continuous modes of two systems operate while shifting phases.

The power supply apparatus 1b has, as shown in FIG. 6, a configuration obtained by newly adding a coil 3a, a transistor 4a, and a diode 5a to a configuration similar to that of the first embodiment including the full-wave rectification circuit 2, the coil 3, the transistor 4, the diode 5, the resistors 6 to 8, the capacitance element 9, and a PFC controller 10b.

To one of the coupling parts of the coil 3a, one of the coupling parts of the coil 3 is coupled. To the other coupling part of the coil 3a, the anode of the diode 5a and one of coupling parts of the transistor 4a are coupled.

To the gate of the transistor 4a, an output terminal OUTa of the PFC controller 10b is coupled. To the other coupling part of the transistor, the reference potential VSS is coupled. To the cathode of the diode 5a, the cathode of the diode 5 is coupled. The other coupling configuration is similar to that of the foregoing first embodiment.

FIG. 7 is a circuit diagram showing a configuration example of the PFC controller 10b.

The PFC controller 10b has a configuration of newly adding a slave logic 28 having a counter and a register, a clock pulse generator 29 for generating a count clock signal for a counter, and a buffer 30 to a configuration similar to that of the first embodiment (FIG. 2) including the error amplifier 11, the current amplifier 12, the comparator 13, the flip flop 14, the buffer 15, the resistor 16, the voltage-current converter 17, the oscillation circuit 18, and the multiplier MUL.

To the input part of the slave logic 28, an output signal output from the output terminal Q of the flip flop 14 is input. To the slave logic 28, the count clock signal generated by the clock pulse generator 29 is input.

The slave logic 28 generates a switch control signal that drives the transistor 4a on the basis of an output signal output from the output terminal Q of the flip flop 14. To the output part of the slave logic 28, the input part of the buffer 30 is coupled. To the output part of the buffer 30, the output terminal OUTa provided for the PFC controller 10b is coupled. A signal output from the buffer 30 is a switch control signal that drives the transistor 4a.

Since the configuration and operation of the voltage-current converter 17 are similar to those of FIG. 3 of the first embodiment, the description will not be repeated.

In this case as well, by adjusting the resistance values of the resistors R1, R2, and R5 in the voltage-current converter 17, the output voltage VO and a change amount of the output voltage VO can be arbitrarily set. Therefore, the low-loss power supply apparatus 1b can be realized at low cost.

Consequently, in the third embodiment as well, the number of switching times of the transistor 4 can be largely reduced, and a switching loss can be decreased.

Fourth Embodiment

Figure 8:
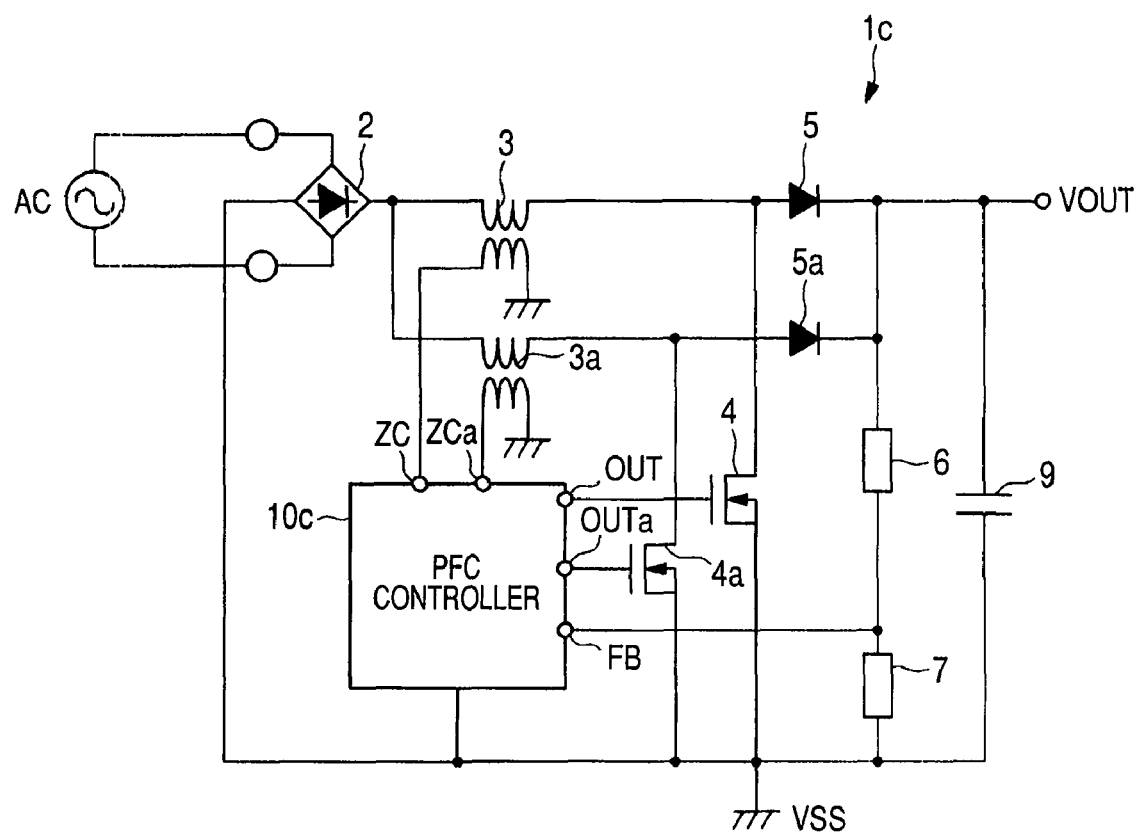
FIG. 8 is a circuit diagram showing a configuration example of a power supply apparatus as a fourth embodiment of the present invention.
Figure 9:
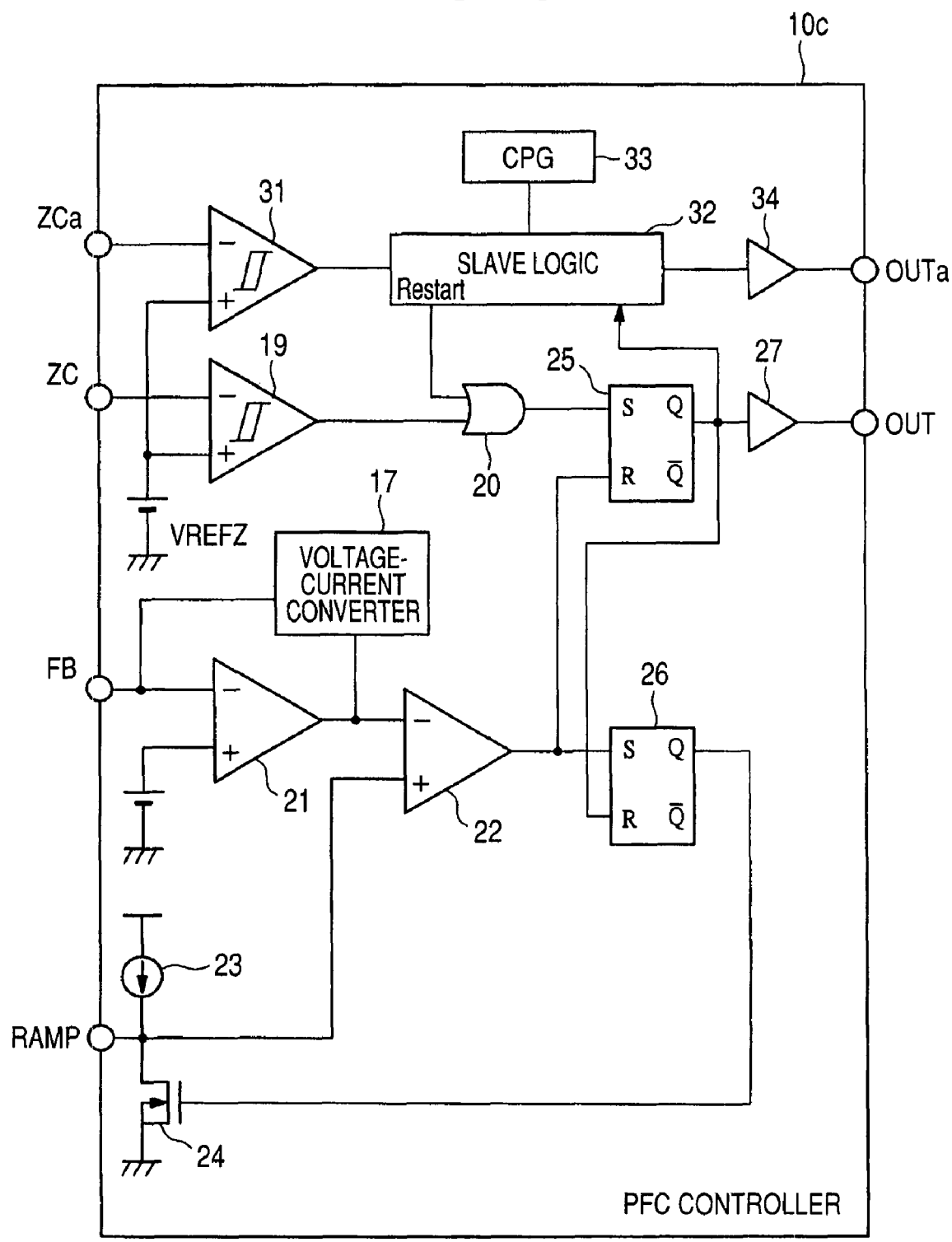
FIG. 9 is a circuit diagram showing a configuration example of a PFC controller provided for the power supply apparatus in FIG. 8.

FIG. 8 is a circuit diagram showing a configuration example of a power supply apparatus as a fourth embodiment of the present invention. FIG. 9 is a circuit diagram showing a configuration example of a PFC controller provided for the power supply apparatus in FIG. 8.

In the fourth embodiment, a power supply apparatus 1c is an AC-DC booster converter under PFC control in an interleave critical mode. The power supply apparatus 1c has, as shown in FIG. 8, a configuration obtained by newly adding a transformer Tr2 using the coil 3a as a primary coil, the transistor 4a, and the diode 5a to a configuration similar to that of the second embodiment including the full-wave rectification circuit 2, the coil 3 (transformer Tr1), the transistor 4, the diode 5, the resistors 6 and 7, the capacitance element 9, and a PFC controller 10c.

To one of the ends on the secondary side of the transformer Tr2, a current detection terminal ZCa of the PFC controller 10c is coupled. To one of the ends on the secondary side of the transformer Tr2, the reference potential VSS is coupled.

The primary side of the transformer Tr2 is the coil 3a, and one of the coupling parts of the coil 3a is coupled to one of the terminals on the output side of the full-wave rectification circuit 2. To the other coupling part of the coil 3a, the anode of the diode 5a and one of coupling parts of the transistor 4a are coupled. To the cathode of the diode 5a, the cathode of the diode 5 is coupled.

To the gate of the transistor 4a, an output terminal OUTa of the PFC controller 10c is coupled. To the other coupling part of the transistor 4a, the reference potential VSS is coupled.

FIG. 9 is a circuit diagram showing a configuration example of the PFC controller 10c.

The PFC controller 10c has a configuration obtained by newly adding a comparator 31, a slave logic 32, a clock pulse generator 33, and a buffer 34 to a configuration similar to that of the second embodiment (FIG. 5) including the voltage-current converter 17, the comparator 19, the OR circuit 20, the error amplifier 21, the comparator 22, the constant current source 23, the transistor 24, the flip flops 25 and 26, and the buffer 27.

To the negative (−) side input terminal of the comparator 31, a current detection terminal ZCa is coupled. To the positive (+) side input terminal of the comparator 31, the reference voltage VREFZ is input.

To one of input parts of the slave logic 32 having a counter, a register, and the like, the output part of the comparator 31 is coupled. To the other input part of the slave logic 32, an output signal output from the output terminal Q of the flip flop 25 is input. To the slave logic 32, a clock signal generated by the clock pulse generator 33 is supplied.

To the output part of the slave logic 32, the input part of the buffer 34 is coupled. To the output part of the buffer 34, the output terminal OUTa is coupled. A signal output from the buffer 34 is a switch control signal of the transistor 4a.

The comparator 31 receives an induction voltage generated by the secondary coil of the transformer Tr2 and, when the induction voltage becomes lower than the reference voltage VREFZ, outputs a high-level detection signal.

The slave logic 32 generates a control signal having a phase difference of a half cycle from a switch control signal output from the output terminal OUT on the basis of an output signal from the comparator 31 and outputs the control signal as a switch control signal via the buffer 34 from the output terminal OUTa.

Since the configuration and operation of the voltage-current converter 17 are similar to those of FIG. 3 of the first embodiment, the description will not be repeated.

In the third embodiment as well, by adjusting the resistance values of the resistors R1, R2, and R5 in the voltage-current converter 17, the output voltage VO and a change amount of the output voltage VO can be arbitrarily set. Therefore, the low-loss power supply apparatus 1c can be realized at low cost.

Fifth Embodiment

Figure 10:
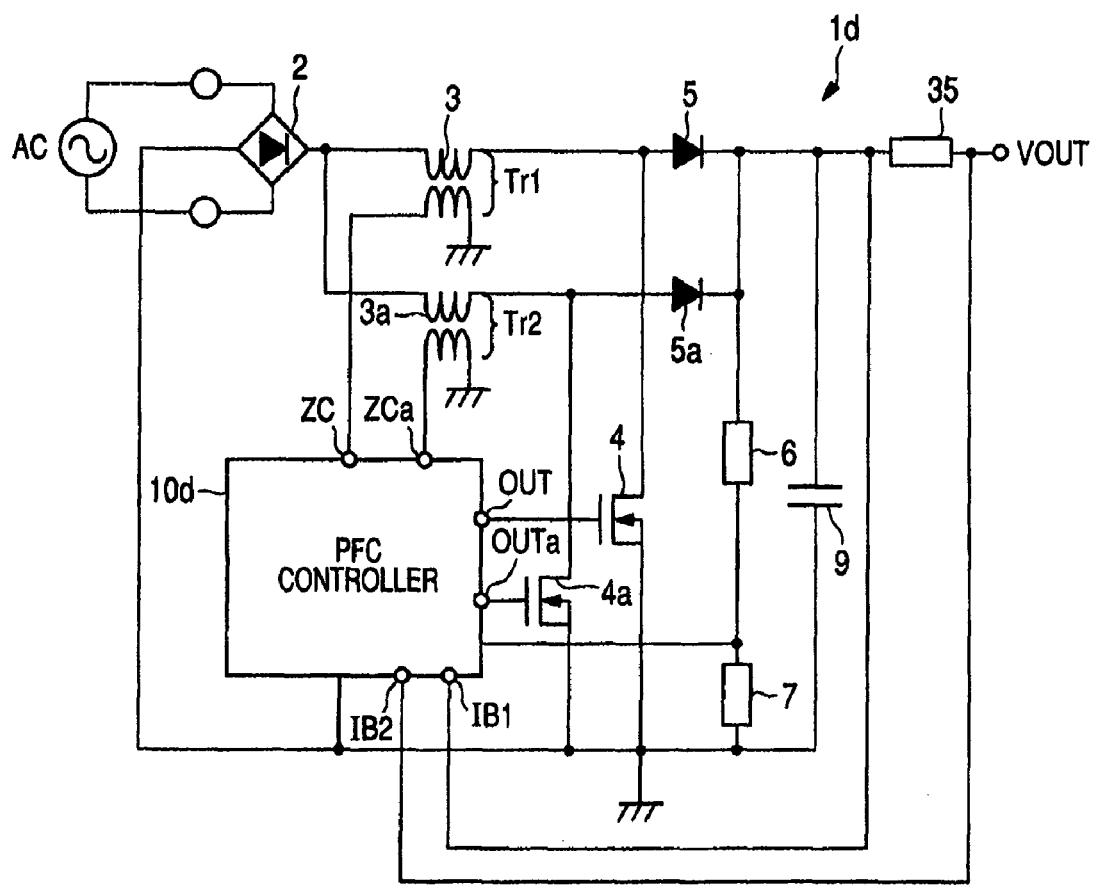
FIG. 10 is a circuit diagram showing a configuration example of a power supply apparatus as a fifth embodiment of the present invention.
Figure 11:
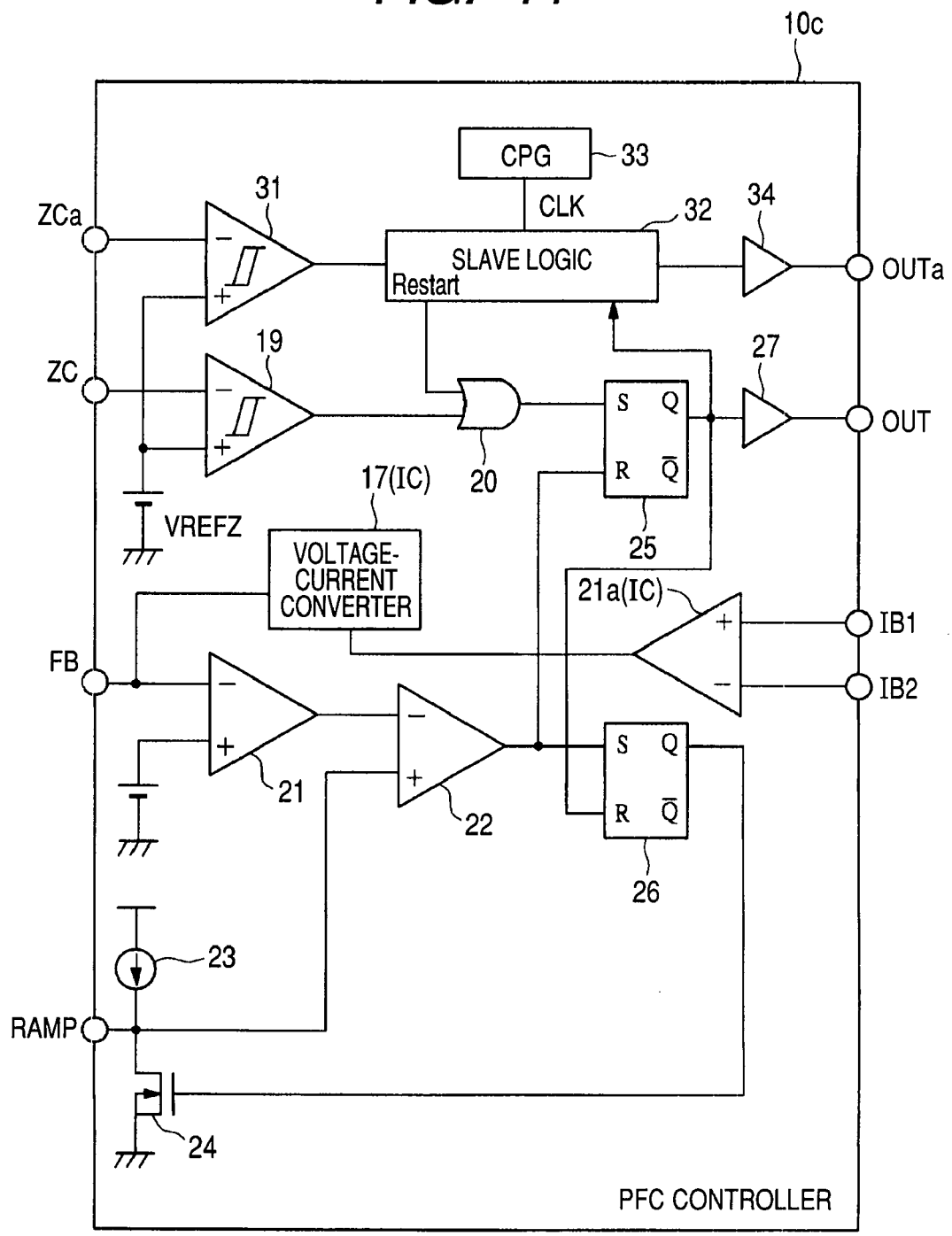
FIG. 11 is a circuit diagram showing a configuration example of a PFC controller provided for the power supply apparatus in FIG. 10.

FIG. 10 is a circuit diagram showing a configuration example of a power supply apparatus as a fifth embodiment of the invention. FIG. 11 is a circuit diagram showing a configuration example of a PFC controller provided for the power supply apparatus of FIG. 10.

In the fifth embodiment, a power supply apparatus 1d is an interleave critical mode and has, as shown in FIG. 10, a configuration obtained by newly adding a resistor 35 as a current detector to a configuration similar to that of the fourth embodiment including the full-wave rectification circuit 2, the coil 3 (the transformer Tr1), the transistor 4, the diode 5, the resistors 6 and 7, the capacitance element 9, the PFC controller 10d, the coil 3a (the transformer Tr2), the transistor 4a, and the diode 5a.

To one of the coupling parts of the resistor 35, the cathodes of the diodes 5 and 5a are coupled. To the other coupling part of the resistor 35, the output terminal VOUT is coupled. Both ends of the resistor 35 are coupled to current detection terminals IB1 and IB2 provided for the PFC controller 10d.

In the first to fourth embodiments, the level of a load is detected on the basis of the output voltage of the error amplifier 11 (or the error amplifier 21). In the power supply apparatus 1d of the fifth embodiment, current flowing in the output terminal VOUT is directly detected by the resistor 35, and correction current is added to the resistor 7 as a feedback resistor, thereby controlling the output voltage VO.

In this case, the PFC controller 10d has, as shown in FIG. 11, a configuration obtained by newly providing an error amplifier 21a to the configuration of the PFC controller 10c (FIG. 9) of the fourth embodiment. The current correction controller IC is comprised of the error amplifier 21a and the voltage-current converter 17.

To the positive (+) side input terminal of the error amplifier 21a, one of coupling parts of the resistor 35 is coupled via the current detection terminal IB1. To the negative (−) side input terminal of the error amplifier 21a, the other coupling part of the resistor 35 is coupled via the current detection terminal IB2.

To an output part of the error amplifier 21a, the input part of the voltage-current converter 17 is coupled. To the output part of the voltage-current converter 17, the coupling part between the resistors 6 and 7 is coupled.

Since the other coupling configuration and operation are similar to those of the fourth embodiment, the description will not be repeated. In this case as well, by adjusting the resistance values of the resistors R1, R2, and R5 in the voltage-current converter 17, the output voltage VO and a change amount of the output voltage VO can be arbitrarily set. Therefore, the low-loss power supply apparatus 1d can be realized at low cost.

Consequently, in the fifth embodiment, the number of switching times of the transistor 4 can be largely reduced, and a switching loss can be decreased.

Sixth Embodiment

Figure 12:
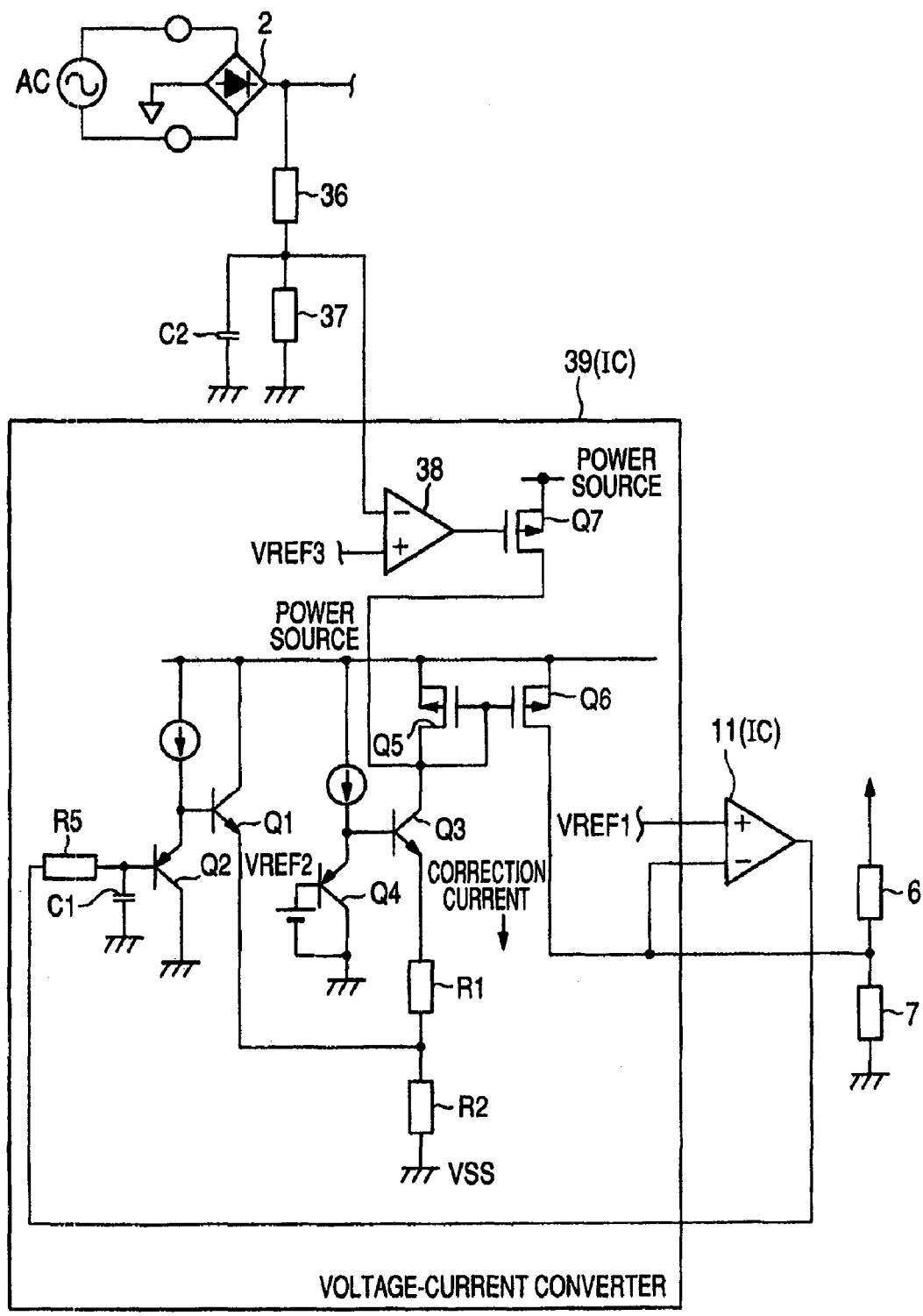
FIG. 12 is a circuit diagram showing a configuration example of a PFC controller provided for the power supply apparatus as the fifth embodiment of the invention.

FIG. 12 is a circuit diagram showing a configuration example of a PFC controller provided for a power supply apparatus as a fifth embodiment of the invention.

In the sixth embodiment, FIG. 12 is a configuration obtained by adding a circuit for stopping the voltage-current converter 17 in any of the first to fourth embodiments of the invention when the AC input/output voltage is high.

As shown in the diagram, the voltage-current converter 39 has a configuration obtained by adding resistors 36 and 37, a capacitor C2, a comparator 38, and a transistor Q7 to a configuration similar to that of FIG. 3 including the transistors Q1 to Q7, resistors R1, R2, and R5, and the capacitance element C1.

The resistors 36 and 37 are coupled between the AC input voltage subjected to full-wave rectification and the reference potential VSS, the capacitor C2 is coupled between the coupling part of the resistors 36 and 37 and the reference potential VSS, the AC input voltage subjected to the full-wave rectification is divided, and the resultant voltage is smoothed.

To the coupling part of the resistors 36 and 37, the negative (−) side input terminal of the comparator 38 is coupled. To the positive (+) side input terminal of the comparator 38, the reference voltage VREF3 is coupled.

To the output part of the comparator 38, the gate of the transistor Q7 is coupled. One of coupling parts (source) of the transistor Q7 is coupled to the power supply voltage, and the other coupling part (drain) is coupled to the gates of the transistors Q5 and Q6.

In the case where the smoothed AC input voltage is higher than the reference voltage VREF3, the output of the comparator 38 changes to the low level, the transistor Q7 is turned on, and the transistors Q5 and Q6 are cut off.

Consequently, even in the case where a load on the power supply apparatus is light, injection of correction current to the resistor 7 is stopped.

In the sixth embodiment, it can be prevented that when the AC input voltage is high and the output voltage VOUT is decreased, the AC input voltage exceeds the output voltage VOUT and boosting operation cannot be performed normally.

Although the inventions achieved by the inventors of the present invention have been described concretely on the basis of the embodiments, obviously, the present invention is not limited to the foregoing embodiments but can be variously modified without departing from the gist.

The present invention is suitable for the technique of controlling voltage conversion when a load is light by a power supply apparatus using a PFC controller.

What is claimed is:

1. A power supply apparatus comprising:
    a power supply unit for boosting an AC input power source and outputting the boosted power source as DC output voltage; and
    a power factor correction (PFC) controller for controlling a switching transistor provided for the power supply unit to suppress a harmonic current,
    wherein the power supply unit has a feedback/resistor for detecting feedback voltage of output voltage used when the PFC controller controls the switching transistor so that the output voltage becomes constant,
    wherein the PFC controller has:
        a drive controller for controlling the switching transistor in accordance with the feedback voltage detected by the feedback resistor; and
        a current correction controller for detecting a load level from the output voltage generated by the power supply unit, generating an arbitrary correction current in accordance with the load level, and supplying the correction current to the feedback resistor,
    wherein the lower the detected load level is, the more the current correction controller increases a current value of the correction current and supplies the current value to the feedback resistor to decrease the output voltage generated by the power supply unit,
    wherein the current correction controller comprises:
        a load detector for detecting the load level from the output voltage generated by the power supply unit; and
        a current corrector for generating the arbitrary correction current in accordance with the load level detected by the load detector and supplying the correction current to the feedback resistor,
    wherein the load detector is an error amplifier for comparing the feedback voltage detected by the feedback resistor with a reference voltage and outputting an error signal.

2. The power supply apparatus according to claim 1, wherein the PFC controller performs control in an interleave critical mode.

3. A power supply apparatus comprising:
    a power supply unit for boosting an AC input power source and outputting the boosted power source as DC output voltage; and
    a power factor correction (PFC) controller for controlling a switching transistor provided for the power supply unit to suppress a harmonic current,
    wherein the power supply unit has a feedback resistor for detecting feedback voltage of output voltage used when the PFC controller controls the switching transistor so that the output voltage becomes constant,
    wherein the PFC controller has:
        a drive controller for controlling the switching transistor in accordance with the feedback voltage detected by the feedback resistor; and
        a current correction controller for detecting a load level from the output voltage generated by the power supply unit, generating an arbitrary correction current in accordance with the load level, and supplying the correction current to the feedback resistor,
    wherein the lower the detected load level is, the more the current correction controller increases a current value of the correction current and supplies the current value to the feedback resistor to decrease the output voltage generated by the power supply unit,
    wherein the current correction controller comprises:
        a load detector for detecting the load level from the output voltage generated by the power supply unit; and
        a current corrector for generating the arbitrary correction current in accordance with the load level detected by the load detector and supplying the correction current to the feedback resistor,
    wherein the power supply unit has a current detector for detecting a current flowing to the output voltage of the power supply unit, and
    wherein the load detector detects the load level on the basis of the current value detected by the current detector.

4. The power supply apparatus according to claim 3, wherein the PFC controller performs control in an interleave critical mode.

5. A semiconductor integrated circuit device having a power factor correction (PFC) controller for suppressing a harmonic current by controlling a switching transistor provided for a power supply unit for boosting an AC input power source and outputting the boosted power source as DC output voltage,
    wherein the PFC controller comprises:
        a drive controller for controlling the switching transistor in accordance with feedback voltage supplied from the outside; and
        a current correction controller for detecting a load level from the output voltage generated by the power supply unit, generating an arbitrary correction current in accordance with the load level, and supplying the correction current to the drive controller,
    wherein the lower the detected load level is, the more the current correction controller increases a current value of the correction current and supplies the current value to the drive controller to decrease the output voltage generated by the power supply unit,
    wherein the current correction controller comprises:
        a load detector for detecting the load level from the output voltage generated by the power supply unit; and
        a current corrector for generating the arbitrary correction current in accordance with the load level detected by the load detector,
    wherein the load detector is an error amplifier for comparing the feedback voltage with reference voltage and outputting an error signal.

6. The semiconductor integrated circuit device according to claim 5, wherein the PFC controller performs control in an interleave critical mode.

* * * * *